US006893617B2

(12) United States Patent
Li et al.

(10) Patent No.: US 6,893,617 B2
(45) Date of Patent: May 17, 2005

(54) APPARATUS AND METHOD FOR RETENTION OF NON-THERMAL PLASMA REACTOR

(75) Inventors: Robert X. Li, Grand Blanc, MI (US); Michael R. Foster, Columbiaville, MI (US); David E. Nelson, Waterford, MI (US); Alan G. Turek, Mayville, MI (US)

(73) Assignee: Delphi Technologies, Inc., Troy, MI (US)

( * ) Notice: Subject to any disclaimer, the term of this patent is extended or adjusted under 35 U.S.C. 154(b) by 740 days.

(21) Appl. No.: 09/881,277

(22) Filed: Jun. 14, 2001

(65) Prior Publication Data

US 2002/0192127 A1 Dec. 19, 2002

(51) Int. Cl.$^7$ ................................................ B01J 19/08
(52) U.S. Cl. .............................. 422/186.04; 422/186.04
(58) Field of Search .................................... 422/186.04

(56) References Cited

U.S. PATENT DOCUMENTS

| | | | |
|---|---|---|---|
| 3,450,617 A | | 6/1969 | Hellund |
| 3,541,379 A | | 11/1970 | Holden |
| 3,979,193 A | | 9/1976 | Sikich |
| 4,232,229 A | * | 11/1980 | Tanaka et al. ........... 422/186.2 |
| 4,695,358 A | | 9/1987 | Mizuno et al. ............. 204/174 |
| 4,795,617 A | | 1/1989 | O'Hare ................... 422/186.15 |

(Continued)

FOREIGN PATENT DOCUMENTS

| | | |
|---|---|---|
| CN | 1027828 C | 1/1995 |
| DE | 3708508 | 3/1987 |
| EP | 0043477 A2 | 6/1981 |
| EP | 0585047 A2 | 8/1993 |
| EP | 0840838 B1 | 7/1996 |

(Continued)

OTHER PUBLICATIONS

Louis A. Rosocha; Los Alamos National Laboratory; *Non-thermal Plasma Applications to Pollution Control and Environmental Remediation*; First International Conference on Advanced Oxidation Technologies for Water and Air Remediation; London, Ontario, Canada, Jun. 25–30, 1994.

(Continued)

*Primary Examiner*—Kishor Mayekar
(74) *Attorney, Agent, or Firm*—Paul L. Marshall

(57) ABSTRACT

A non-thermal plasma reactor is provided. The reactor includes a plasma-generating substrate, a housing, a voltage supplied to the plasma-generating substrate, and a retention material. The plasma-generating substrate has one or more flow paths for an exhaust gas. The plasma-generating substrate includes at least one weak area and at least one strong area. The housing has an inlet opening and an outlet opening. The voltage is supplied to the plasma-generating substrate for generating a plasma field. The retention material retains the plasma-generating substrate in the housing such that the one or more flow paths are in fluid communication with the inlet opening and the outlet opening. The retention material is configured to provide a higher retention force to the at least one strong area and a lower retention force to the at least one weak area.

17 Claims, 17 Drawing Sheets

U.S. PATENT DOCUMENTS

| | | | |
|---|---|---|---|
| 4,813,231 A | 3/1989 | Bykowski | 60/274 |
| 4,945,721 A | 8/1990 | Cornwell et al. | 60/274 |
| 5,044,157 A | 9/1991 | Henkel | 60/274 |
| 5,141,714 A | 8/1992 | Obuchi et al. | 422/174 |
| 5,147,516 A | 9/1992 | Mathur et al. | 204/177 |
| 5,155,994 A | 10/1992 | Muraki et al. | 60/275 |
| 5,236,672 A | 8/1993 | Nunez et al. | 422/186.04 |
| 5,240,575 A | 8/1993 | Mathur et al. | 204/177 |
| 5,324,492 A | 6/1994 | Masuda et al. | 423/235 |
| 5,419,123 A | 5/1995 | Masters | 60/274 |
| 5,427,747 A | 6/1995 | Kong et al. | 422/186 |
| 5,440,876 A | 8/1995 | Bayliss et al. | 60/274 |
| 5,458,748 A | 10/1995 | Breault et al. | 204/177 |
| 5,492,678 A | 2/1996 | Ota et al. | 422/174 |
| 5,603,893 A | 2/1997 | Gundersen et al. | 422/22 |
| 5,692,481 A | 12/1997 | Miller | 123/539 |
| 5,695,619 A | 12/1997 | Williamson et al. | 204/165 |
| 5,746,051 A | 5/1998 | Kieser et al. | 60/275 |
| 5,746,984 A | 5/1998 | Hoard | 422/169 |
| 5,806,305 A | 9/1998 | Miller et al. | 60/274 |
| 5,843,383 A | 12/1998 | Williamson et al. | 422/186.04 |
| 5,863,413 A | 1/1999 | Caren et al. | 205/688 |
| 6,012,283 A | 1/2000 | Miller et al. | 60/274 |
| 6,029,442 A | 2/2000 | Caren et al. | 60/275 |
| 6,047,543 A | 4/2000 | Caren et al. | 60/275 |
| 6,048,500 A | 4/2000 | Caren et al. | 422/186.3 |
| 6,106,788 A * | 8/2000 | Rau et al. | 422/186.07 |
| 6,139,694 A | 10/2000 | Rogers et al. | 204/177 |
| 6,159,430 A | 12/2000 | Foster | 422/179 |
| 6,176,078 B1 | 1/2001 | Balko et al. | 60/274 |
| 6,253,544 B1 | 7/2001 | Miller et al. | 60/275 |
| 6,264,899 B1 | 7/2001 | Caren et al. | 422/186.3 |
| 6,338,827 B1 | 1/2002 | Nelson et al. | |
| 6,354,903 B1 | 3/2002 | Nelson | |
| 6,368,451 B1 | 4/2002 | Goulette et al. | |
| 6,423,190 B2 | 7/2002 | Hemingway et al. | |
| 6,464,945 B1 | 10/2002 | Hemingway | |
| 6,482,368 B2 | 11/2002 | Hemingway et al. | |
| 6,537,507 B2 | 3/2003 | Nelson et al. | |
| 6,638,484 B2 | 10/2003 | Nelson et al. | |

FOREIGN PATENT DOCUMENTS

| | | |
|---|---|---|
| GB | 2274412 | 12/1993 |
| JP | 486974 A | 3/1973 |
| JP | 63242323 | 10/1988 |
| JP | 4276167 | 10/1992 |
| JP | 05263467 | 10/1993 |
| JP | 6015143 | 1/1994 |
| JP | 6099031 | 4/1994 |
| JP | 6106025 | 4/1994 |
| JP | 6178914 | 6/1994 |
| JP | 6182150 | 7/1994 |
| JP | 6269635 | 9/1994 |
| WO | WO94/06543 | 3/1994 |
| WO | WO99/18333 | 4/1999 |
| WO | WO00/04989 | 2/2000 |
| WO | WO00/43469 | 7/2000 |
| WO | WO00/50743 | 8/2000 |

OTHER PUBLICATIONS

Wachsman, Eric; Palitha Jayaweera; Victor L.K. Wong; Jon G. McCarty; Gopala Krishnan; Angel Sanjurjo; *Solid–Oxide Electrochemical Reduction and Selective Absorption of $NO_x$*; Proceedings of the 1995 Diesel Engine Emissions Reduction Workshop, San Diego California, Jul. 24–27, 1995: U.S. Department of Energy.

Huang, Shih–feng; Satoshi Ihara; Masashi Ishimine; Saburoh Satoh; Chobei Yamabe; *Reduction of $NO_x$ by a DC Positive Streamer Reactor with a Wire–to–Plane Electrodes*; Report of the Faculty of Science and Engineering, Saga University, vol. 25, 1997; p 27–31.

Hammer, Thomas; Stefan Broer; 982428; *Plasma Enhanced Selective Catalytic Reduction of $NO_x$ for Diesel Cars*; Copyright 1998 Society of Automotive Engineers, Inc. p. 7–12.

Hoard, John; M. Lou Balmer; 982429; *Analysis of Plasma–Catalysis for Diesel $NO_x$ Remediation*; Copyright 1998 Society of Automotive Engineers, Inc.; p. 13–19.

McLarnon, C.R.; V.K. Mathur; University of New Hampshire, *Nitrogen Oxide Decomposition by Barrier Discharge*; 1999 Diesel Engine Emissions Reduction Workshop, Maine Maritime Academy, Castine, Maine, Jul. 5–9, 1999; IV–73–IV–78.

Kupe, J.; Delphi Automotive Systems; *Non–Thermal Plasma Emission System for Diesel Exhaust After Treatment*; 1999 Diesel Engine Emissions Reduction Workshop; Maine Maritime Academy, Castine Maine, Jul. 5–9, 1999; IV–29–64.

Hemingway, Mark D.; Dave Goulette; Gene Ripley; Tom Thoreson; Joachim Kupe; Darrell Herling; Suresh Baskaran; Monty Smith; Del Lessor and Jud Virden; 1999–01–3639 *Evaluation of a Non–Thermal Plasma System for Remediation of $NO_x$ in Diesel Exhaust*; Copyright 1999, Society of Automotive Engineers, Inc.; p. 59–65.

Hammer, Thomas; Tetsuo Kishimoto; Hans Miessner; Rolf Rudolph; 1999–01–3632; *Plasma Enhanced Selective Catalytic Reduction: Kinetics of $NO_x$ –Removal and Byproduct Formation*; Copyright 1999 Society of Automotive Engineers, Inc. p. 1–7.

Roth, Greg; Jim Rush; Vic Nowak; Mike Tyle; 2000–01–1845; *A Compact and Robust Corona Discharge Device (CDD™) for Generating Non–Thermal Plasma in Automotive Exhaust*; Copyright 2000 CEC and SAE International; p. 21–34.

Herling, Darrell; Monty Smith, Mark Hemingway, David Goulette, Tom Silvis; 2000–01–2899; *Evaluation of Corona Reactors of Several Geometries for a Plasma Assisted Nitrogen Oxide Emission Reduction Device*; Copyright 2000, Society of Automotive Engineers, Inc. p. 49–58.

Fisher, Galen B; Craig L DiMaggio; Aleksey Yezerets; Mayfair C. Kung; Harold H. Kung; Suresh Baskaran; John G. Frye; Monty R. Smith; Darrell R. Herling; William J. LeBarge; Joachim Kupe; 2000–01–2965 *Mechanistic Studies of the Catalytic Chemistry of $NO_x$ in Laboratory Plasma–Catalyst Reactors*; Copyright 2000 Society of Automotive Engineers, Inc. p. 79–87.

* cited by examiner

APPARATUS AND METHOD FOR RETENTION OF NON-THERMAL PLASMA REACTOR

CROSS REFERENCE TO RELATED APPLICATIONS

The application is related to U.S. Pat. No. 6,159,430 the contents of which are incorporated herein by reference thereto.

TECHNICAL FIELD

This application relates to a non-thermal plasma reactor for reduction of nitrogen oxides (hereinafter $NO_x$). More particularly, this application relates to methods of retaining a plasma-generating substrate in a non-thermal plasma reactor.

BACKGROUND

The removal of $NO_x$ from the exhaust gases of internal combustion engines is required for cleaner operating vehicles. Improvements in fuel efficiency are achieved by operating at conditions with an excess of air than required for stoichiometric combustion (i.e., lean burn or rich conditions). Such "lean burn" conditions are commonly achieved in diesel engines and four cycle engines. However when lean-burn conditions are employed, common pollution reduction devices (e.g., three-way catalysts) are inefficient in the reduction of nitrogen oxides.

One approach to reduce nitrogen oxide pollutants in exhaust gases of engines operating under lean-burn conditions has been to incorporate a non-thermal plasma reactor in the exhaust lines along in addition to a catalyst converter formulated for the $NO_x$ reduction. Such reactors treat the exhaust gases using a non-thermal plasma field. The plasma converts NO to $NO_2$, the $NO_2$ must then be subsequently reduced by a selective catalyst. For example, a non-thermal plasma reactor is described in U.S. Pat. No. 6,139,694, the contents of which are incorporated by reference herein.

Non-thermal plasma reactors include a non-thermal plasma-generating substrate ("substrate") disposed within a housing. The substrate includes a plurality of dielectric plates each being spaced from one another to form a plurality of exhaust gas flow channels. Preferably, the dielectric plates are non-conductive materials such as quartz, glass, alumina, mullite, and oxide free ceramics (e.g., silicon nitrite, boron nitrite, aluminum nitrite). A voltage supply is connected to a pair of electrodes on each dielectric plate for providing a voltage between the dielectric plates in order to generate the plasma field in the flow channel between the plates. The exhaust gas flows through the flow channel, exposing the gas to the plasma field. The plasma field converts NO into nitrogen dioxide or $NO_2$.

The dielectric plates are prone to crushing from forces applied to the surface of the plates parallel to the flow passage due to the thin cross section of the plates and due to the fact that they are only supported at two sides of the passage. Thus, the forces necessary to restrain the substrate in the housing may damage the unsupported surface areas and may bend or deform the outer plates into the flow passage. The substrate must be isolated from the housing to prevent high voltage arcing from a buss line termination on the substrate to the housing. Moreover, the substrate is subject to heating and cooling cycles, which places an additional strain on the substrate. These factors and others create obstacles with respect to retaining the substrate in the reactor.

SUMMARY

A non-thermal plasma reactor including a plasma-generating substrate, a housing, a high voltage feed through device, and a retention material is provided. The plasma-generating substrate has one or more flow passages for an exhaust gas. The plasma-generating substrate includes a weak area and a strong area. The housing has an inlet opening and an outlet opening. The voltage is supplied to the plasma-generating substrate for generating a plasma field through the high voltage feed through device. The retention material retains the plasma-generating substrate in the housing such that the flow passages are in fluid communication with the inlet opening and the outlet opening. The retention material is configured to provide a higher retention force to the at least one strong area, and a lower retention force to the at least one weak area to seal the exhaust gas bypass.

A unitary exhaust system component comprising a non-thermal plasma reactor, a particulate filter, and a catalytic converter in a single housing is provided. The non-thermal plasma reactor oxidizes nitrogen oxides to nitrogen dioxide in an exhaust stream and includes an inlet opening and an outlet opening. The plasma-generating substrate has one or more exhaust passages in fluid communication with the inlet opening and the outlet opening. A voltage is supplied to the plasma-generating substrate for generating a plasma field. The particulate filter captures particulate matter from the exhaust stream upstream of the substrate. The catalytic converter for removes the nitrogen dioxide, hydrocarbon and carbon monoxide from the exhaust stream downstream of the substrate.

A first or stuffing method of retaining a non-thermal plasma substrate is provided. The method includes providing a housing, providing a plasma-generating substrate, wrapping the plasma-generating substrate with a retention material, and stuffing the plasma-generating substrate wrapped with the retention material in the housing. The housing has a first open end and a second open end. The non-thermal plasma-generating substrate has one or more flow paths for an exhaust gas and a weak area and a strong area. The non-thermal plasma-generating substrate is stuffed into the housing through the first open end or the second open end such that the flow paths are in fluid communication with the open ends. Thus, the retention material provides a higher retention force to the strong area and a lower retention force to the weak area.

A second or clamping method of retaining a non-thermal plasma substrate is provided. The method includes providing two half shells defining a housing, providing a plasma-generating substrate, wrapping the plasma-generating substrate with a retention material, and securing the first half shell to the second half shell to retain the plasma-generating substrate in the housing. The plasma-generating substrate has one or more flow paths for an exhaust gas and includes at least one weak area and at least one strong area. The plasma-generating substrate is secured in the housing such that the retention material provides a higher retention force to the at least one strong area and a lower retention force to the at least one weak area.

The above-described and other features and advantages of the present application will be appreciated and understood by those skilled in the art from the following detailed description, drawings, and appended claims.

DESCRIPTION OF THE PREFERRED EMBODIMENT

Figure 1:
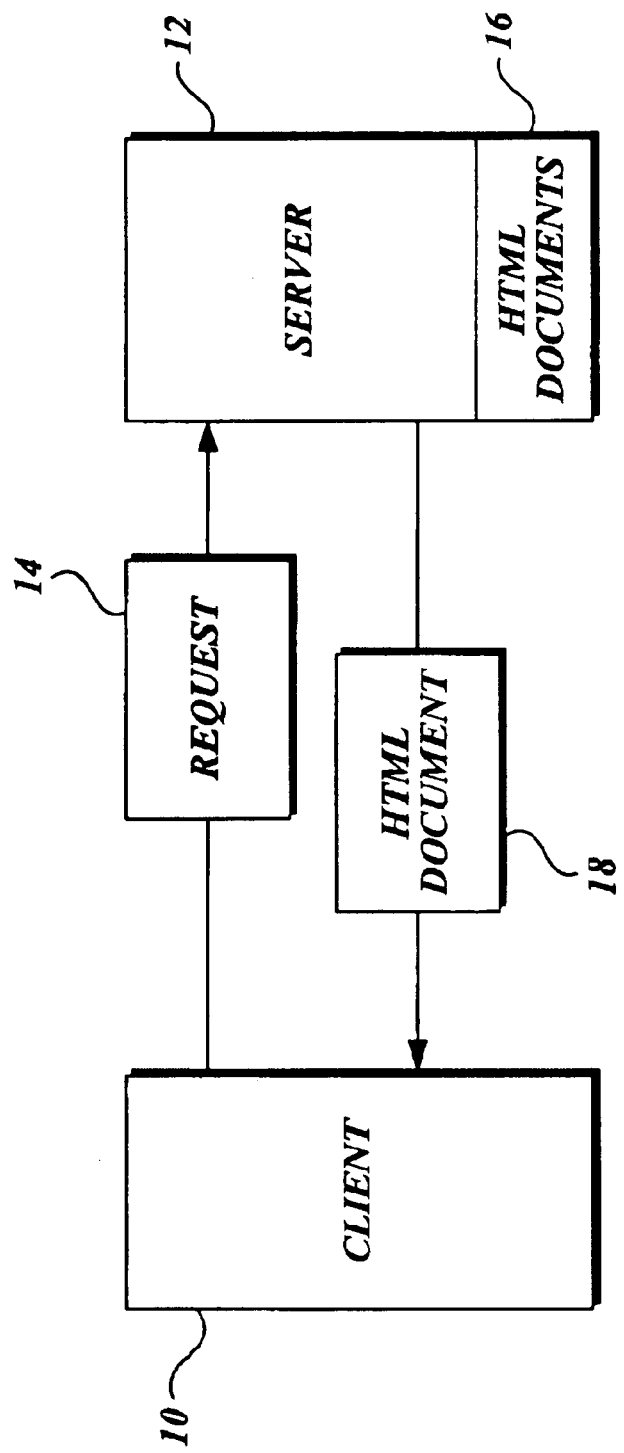
FIG. 1 is a partial exploded view of a non-thermal plasma reactor retained in a housing by a first retention method.

Referring to FIG. 1, an exemplary embodiment of a non-thermal plasma reactor 10 is illustrated. Non-thermal plasma reactor 10 (reactor) includes a housing 12. As illustrated in FIG. 1, housing 12 is an elongated cylinder with open ends. It also contemplated for housing 12 to have alternate configurations including, but not limited to elongated rectangular, ovals, trapezoids and the like. An end cap 14 is secured at each of the open ends of housing 12 defining an inlet opening 15 and an outlet opening 17. Reactor 10 includes a retention material 16 and a substrate 18. Substrate 18, described in detail below, is a non-thermal plasma-generating substrate that generates a plasma field in the substrate. Exposing exhaust gas to the plasma field in substrate 18 converts NO into nitrogen dioxide $NO_2$.

Housing 12 as illustrated in FIG. 1 has a one-piece construction. In this embodiment, substrate 18 and housing 12 have a circular cross section. Preferably, housing 12 is made of material capable of withstanding the high temperature (e.g., in excess of 500 degrees Celsius) and high corrosive working environment of reactor 10. For example, housing 12 is made of metal, such as stainless steel. Retention material 16 is adapted to retain substrate 18 in housing 12 and to seal the gap between the substrate and the housing. Preferably, substrate 18 is wrapped with retention material 16 and inserted into housing 12 by appropriate means, such as being fed by a guide (not shown). Reactor 10 is completed by connecting, such as by welding, ends 14 to housing 12. Accordingly, FIG. 1 illustrates a first or stuffing retention method for retaining substrate 18 in housing 12.

Figure 2:
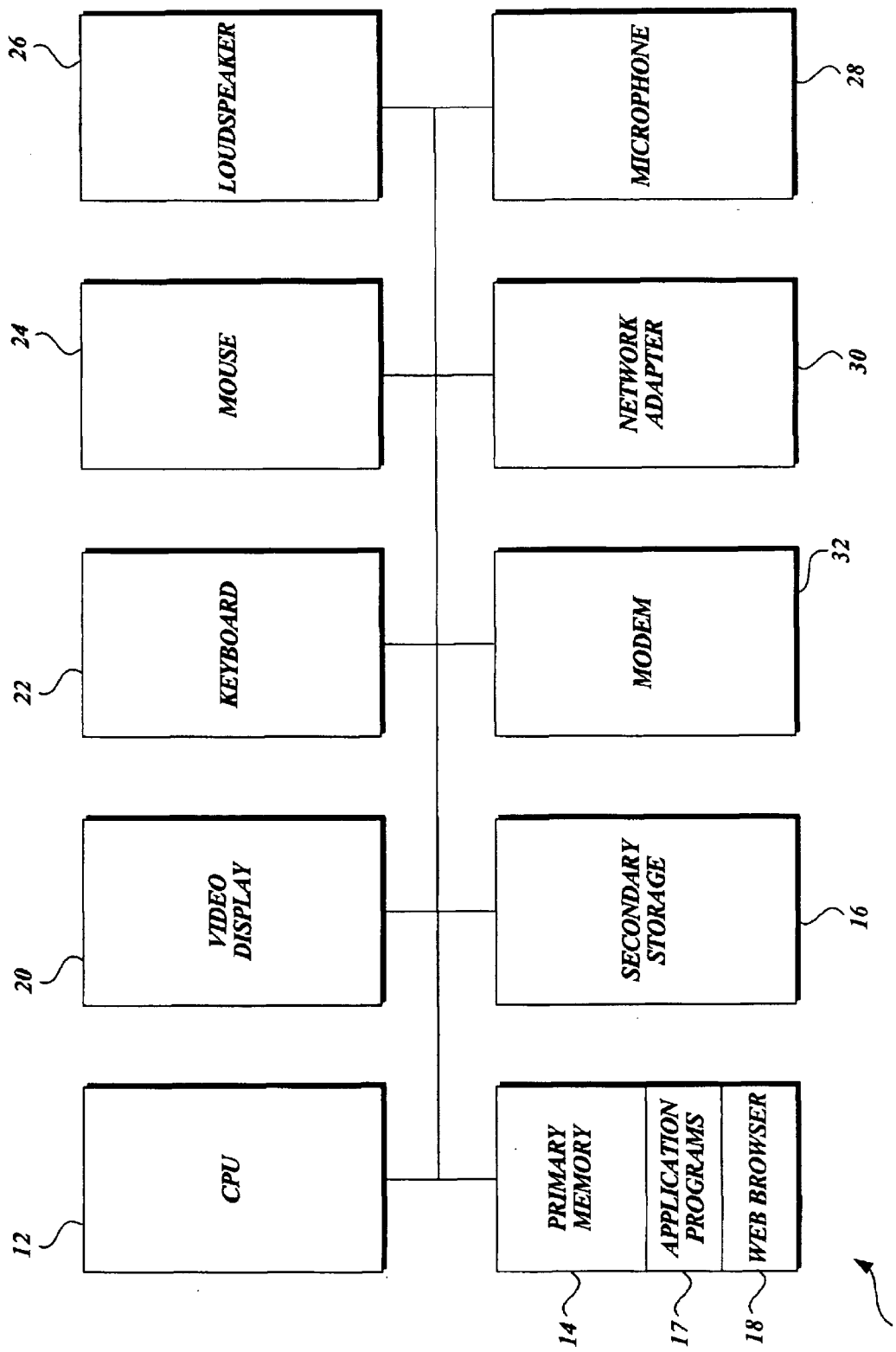
FIG. 2 is an exploded view of an exemplary embodiment of a non-thermal plasma reactor retained in a housing by a second retention method.
Figure 3A:
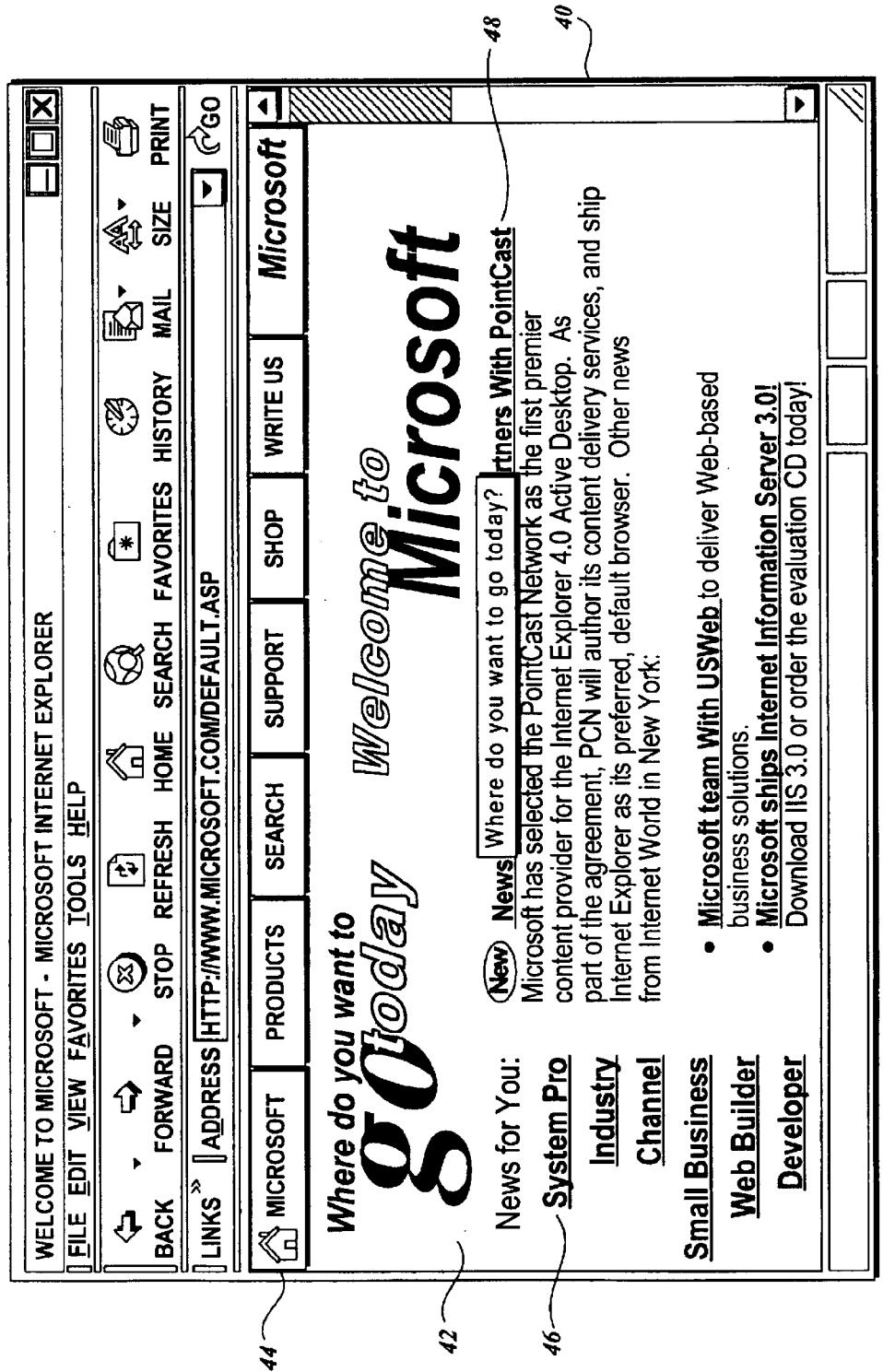
FIG. 3 is an end view of the non-thermal plasma reactor of FIG. 2, taken along lines 3—3.
Figure 3B:
Figure 3C:
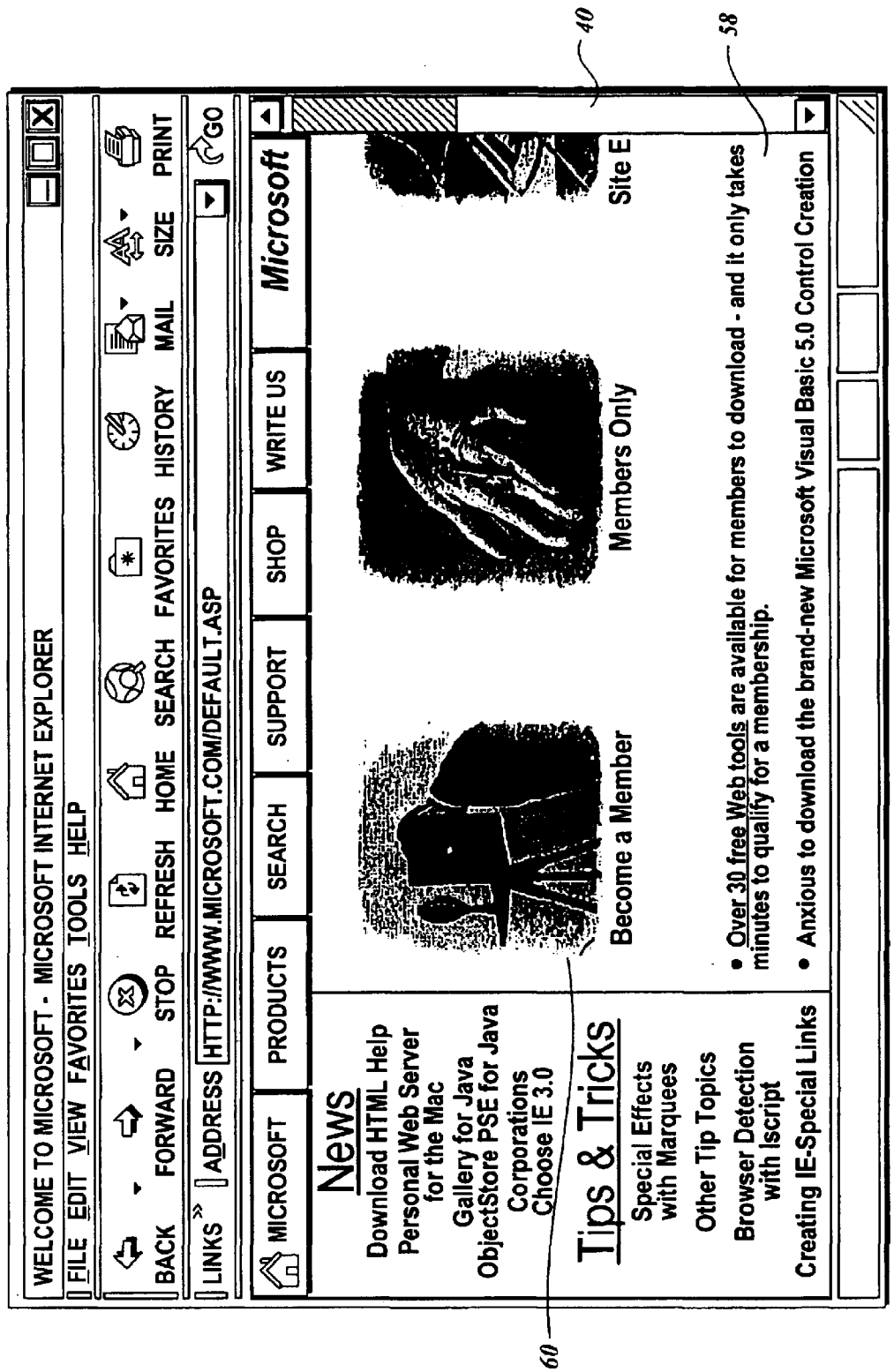
Figure 3:
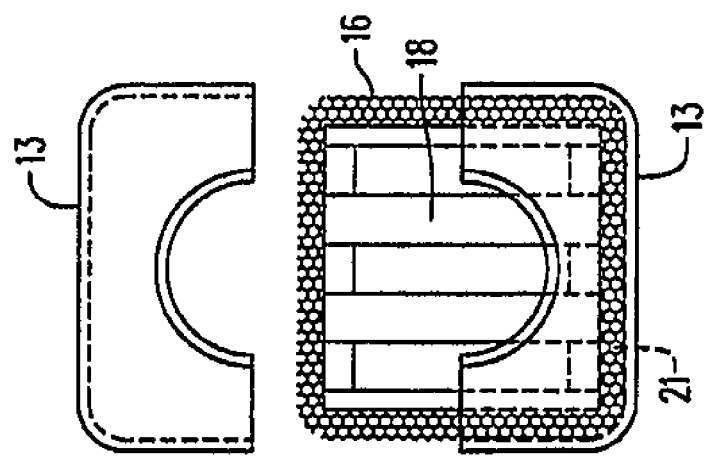
Figure 2:
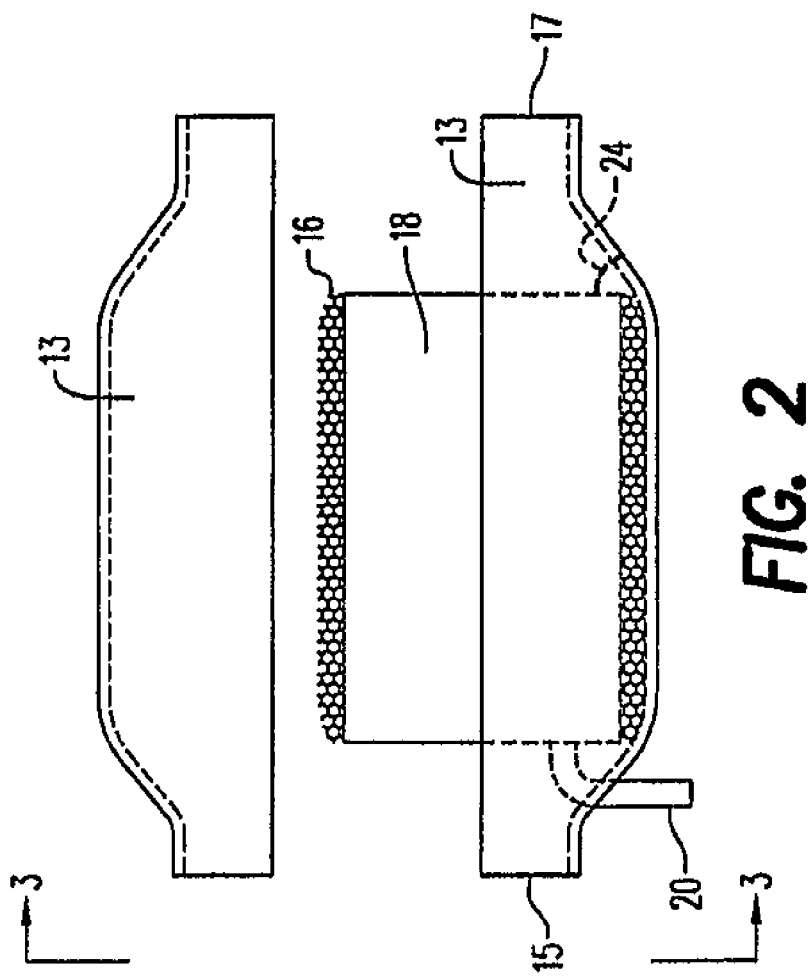
Figure 4:
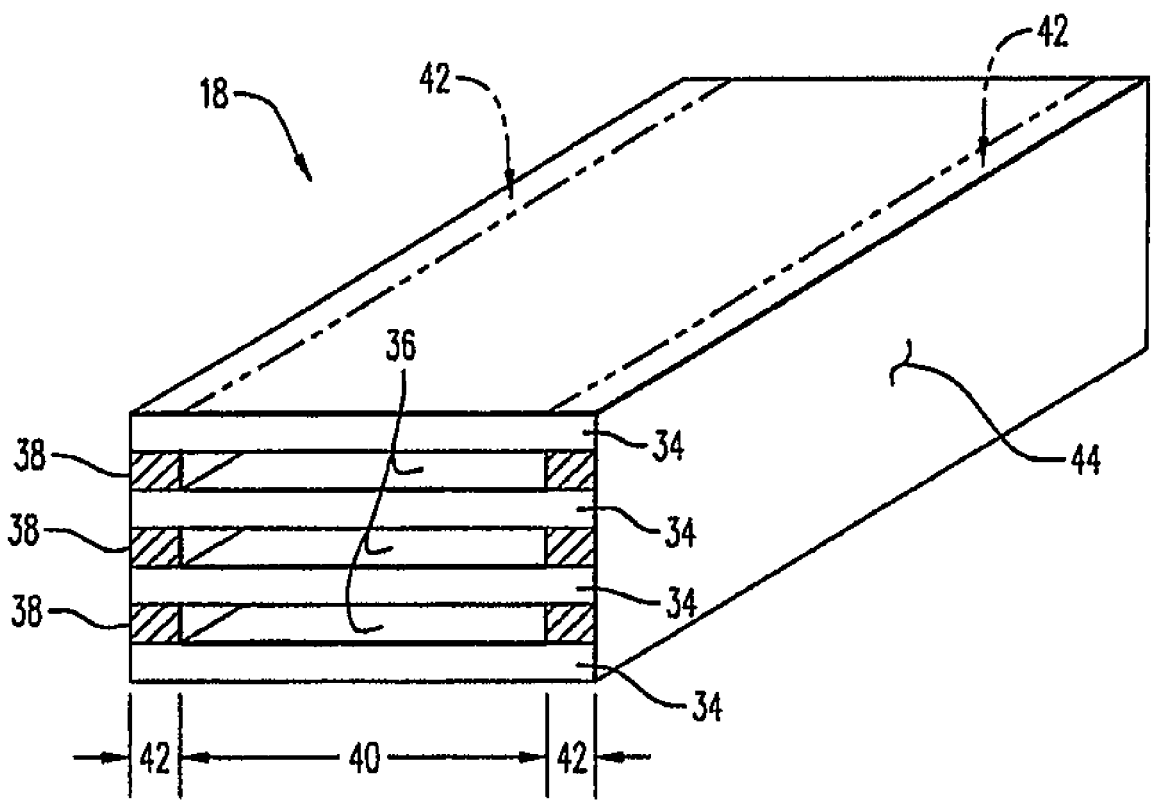

Housing 12 illustrated in FIGS. 2 and 3 has a two-piece or clamp shell construction including a pair of shells 13. In this embodiment, substrate 18 and housing 12 have a rectangular cross section. Preferably, substrate 18 is wrapped with retention material 16 and is placed between shells 13. Shells 13 are clamped to one another securing substrate 18 therein. Accordingly, FIGS. 2 and 3 illustrates a second or clamping retention method for retaining substrate 18 in housing 12. As illustrated in FIG. 2, reactor 10 includes a voltage port 20 and a ground 24. Voltage port 20 supplies high voltage to substrate 18.

It should be recognized that housing 12, retention material 16 and substrate 18 are described above by way of example only as having one piece construction and circular cross-sections in the stuffing method and two-piece construction and rectangular cross-sections in the clamping method, respectively. However, any combination of multiple piece construction and corresponding cross sections used for either the stuffing or the clamping method are considered within the scope of the present application.

A gap 21 is defined between substrate 18 and housing 12. Gap 21, typically a minimum of about 19 mm, electrically isolates housing 12 from substrate 18 in order to prevent electrical arcing of the current of substrate 18 to housing 12. It should be recognized that gap 21 is described above by way of example as about 19mm, however the gap having any dimension sufficient to electrically isolate housing 12 from substrate 18 is within the scope of the invention. Retention material 16 fills gap 21 between housing 12 and substrate 18, and forms an interference fit with the housing to hold the substrate in the appropriate location. Preferably, retention material 16 is a compressible fiber material, thus the compression of the retention material forming the interference fit with housing 12 provides the retention forces necessary to retain substrate 18 in the housing. Retention material 16 is made of a high temperature resistive ceramic fiber material, preferably comprising alumina.

Retention material 16 is adapted to absorb the thermal expansion and compression of substrate 18, which is in the range of about $7 \times 10^{-6}$ mm per degree Celsius. For example, retention material 16 is 1100 HT supplied by 3M Company, which is capable of withstanding the temperature environment within reactor 10 and is capable of retaining substrate 18 throughout the expansion and contraction of the substrate.

Retention material 16, such as the 1100 HT described above, includes a plurality of fibers bound together with a binder, often hydrocarbon based binders. The binder is used to improve material handling (i.e., prevent loss of fibers during handling) of retention material 16. It is possible for the binder that to become conductive when heated during use. Thus during manufacture of reactor 10, the reactor is pre-heat to a high enough temperature to bum out the binder material prior to use. In the example described above where retention material 16 is 1100 HT, reactor 10 is pre-heated to about 500 degrees C. to burn off any binder from the retention material.

Figure 4:
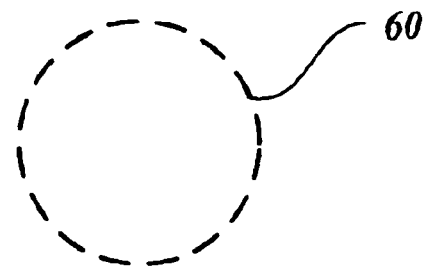
FIG. 4 is a perspective view of a substrate of a non-thermal plasma reactor.
Figure 4:
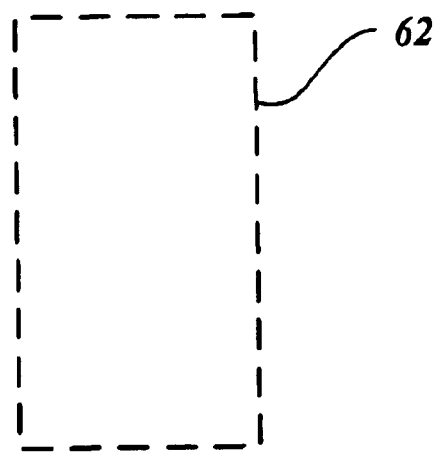
Figure 4:
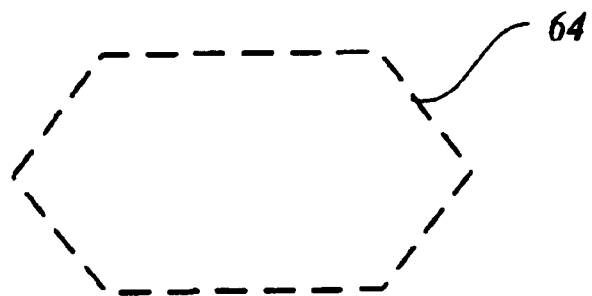
Figure 5A:
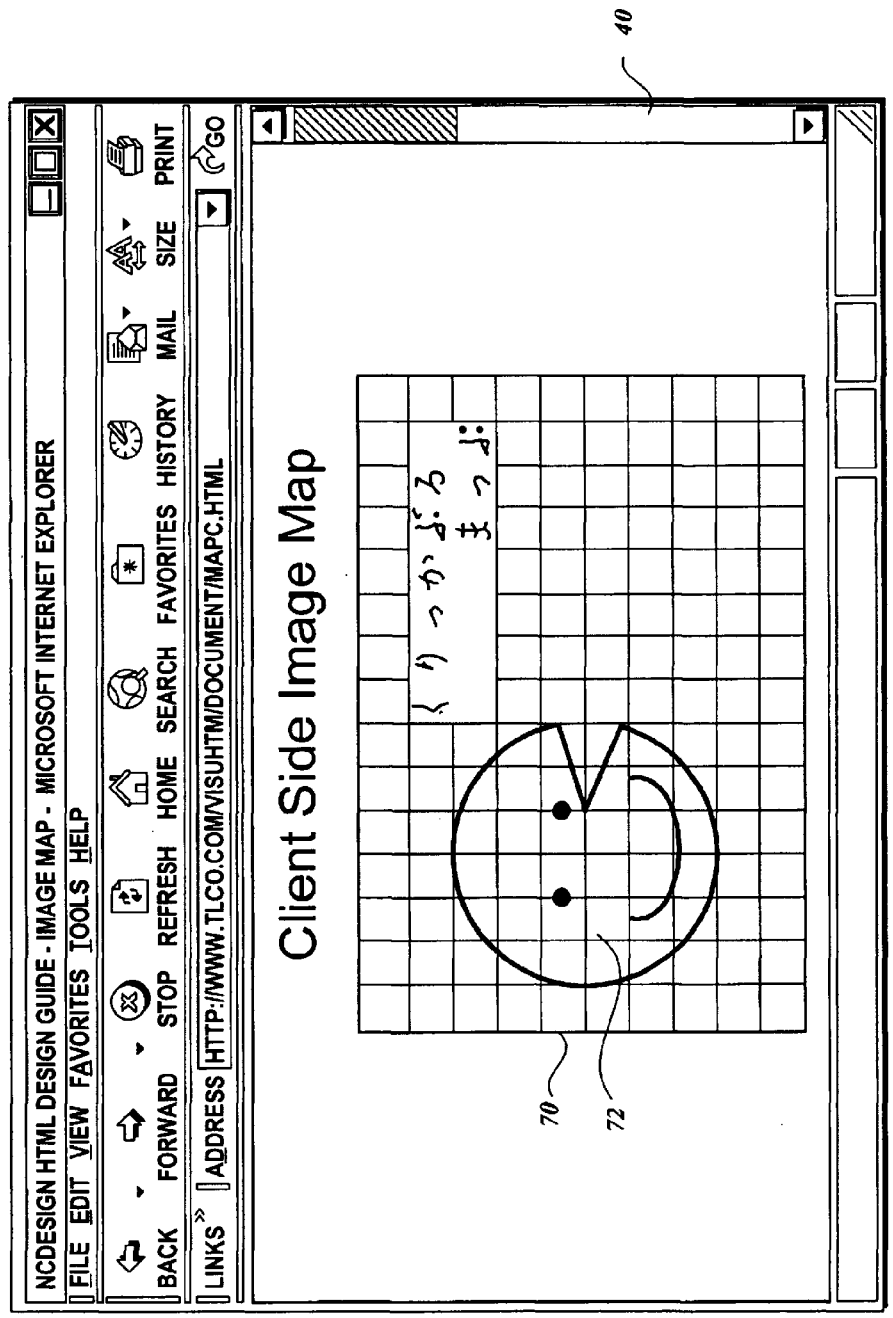
FIG. 5 is a cross sectional view of an alternative embodiment of the present invention.
Figure 5B:
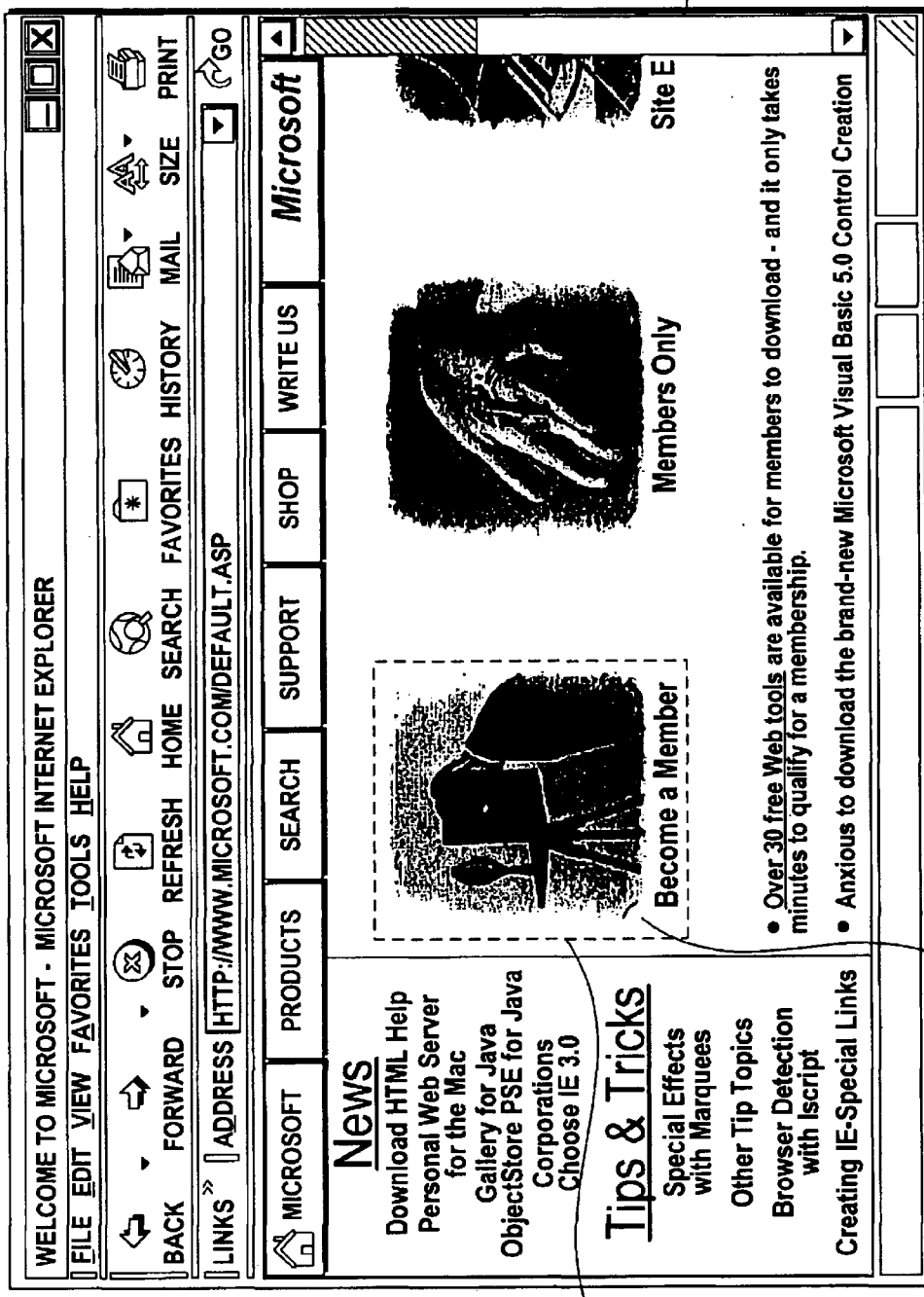
Figure 5C:
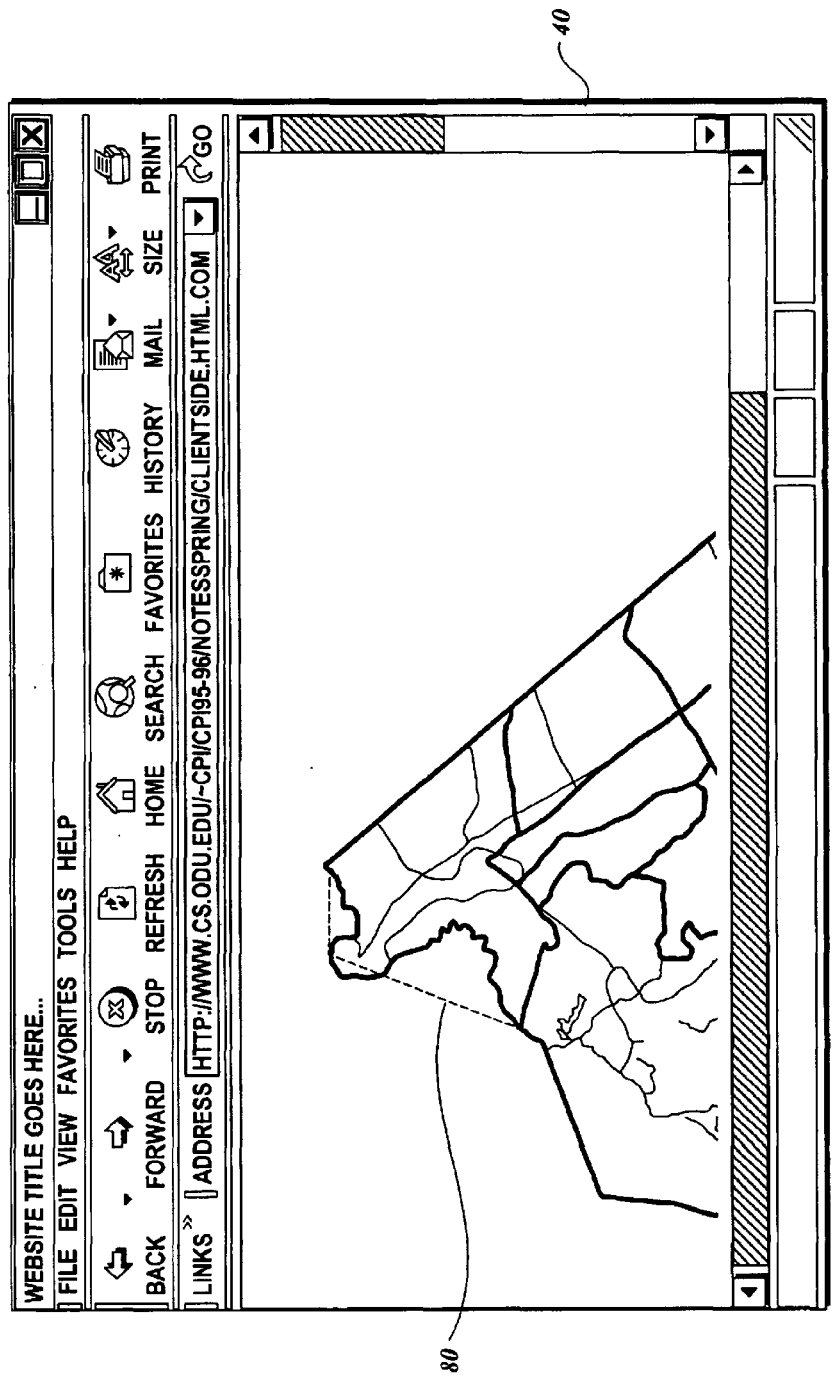
Figure 6A:
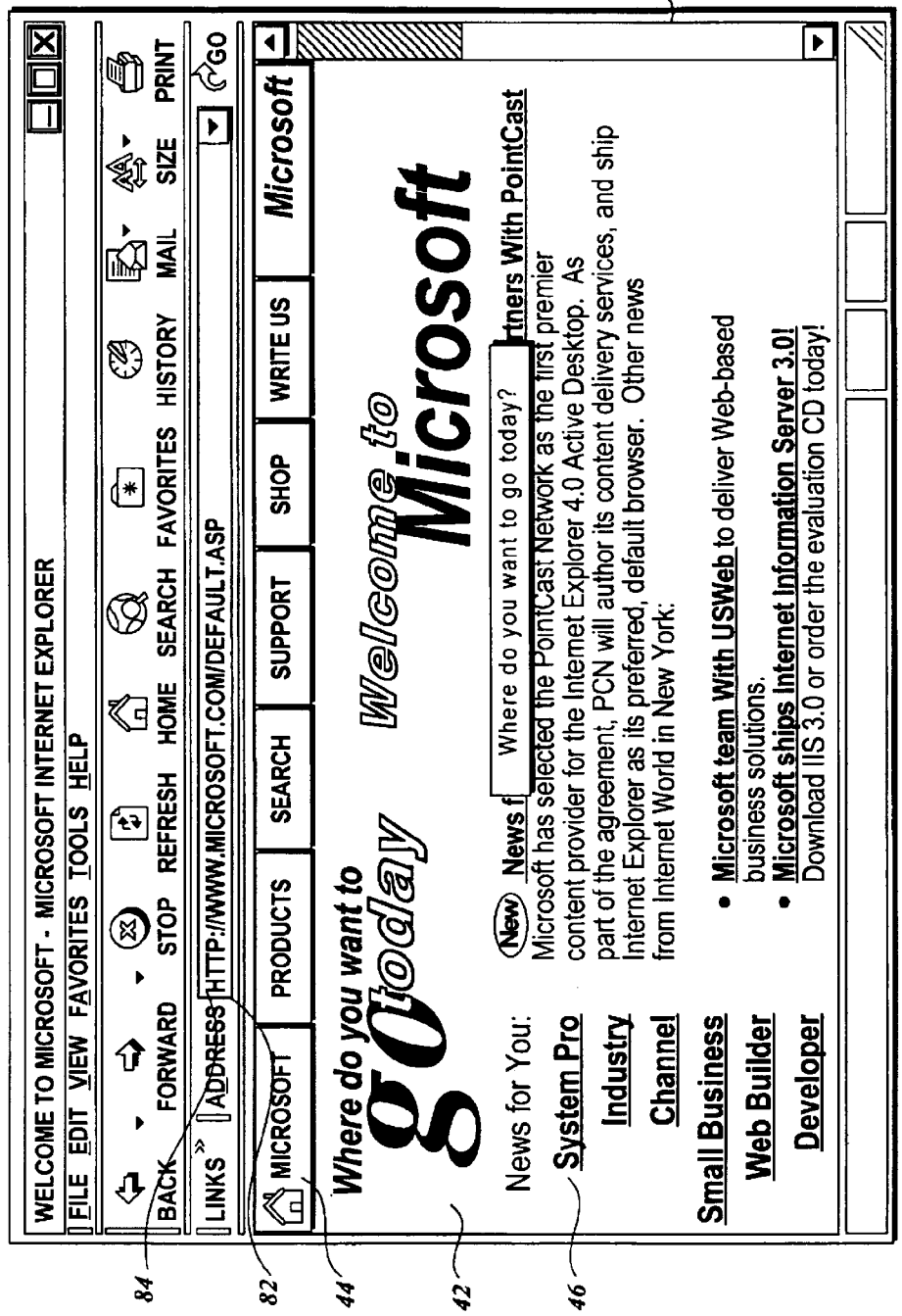
FIG. 6 is a sectional view along lines 6—6 of FIG. 5.
Figure 6B:
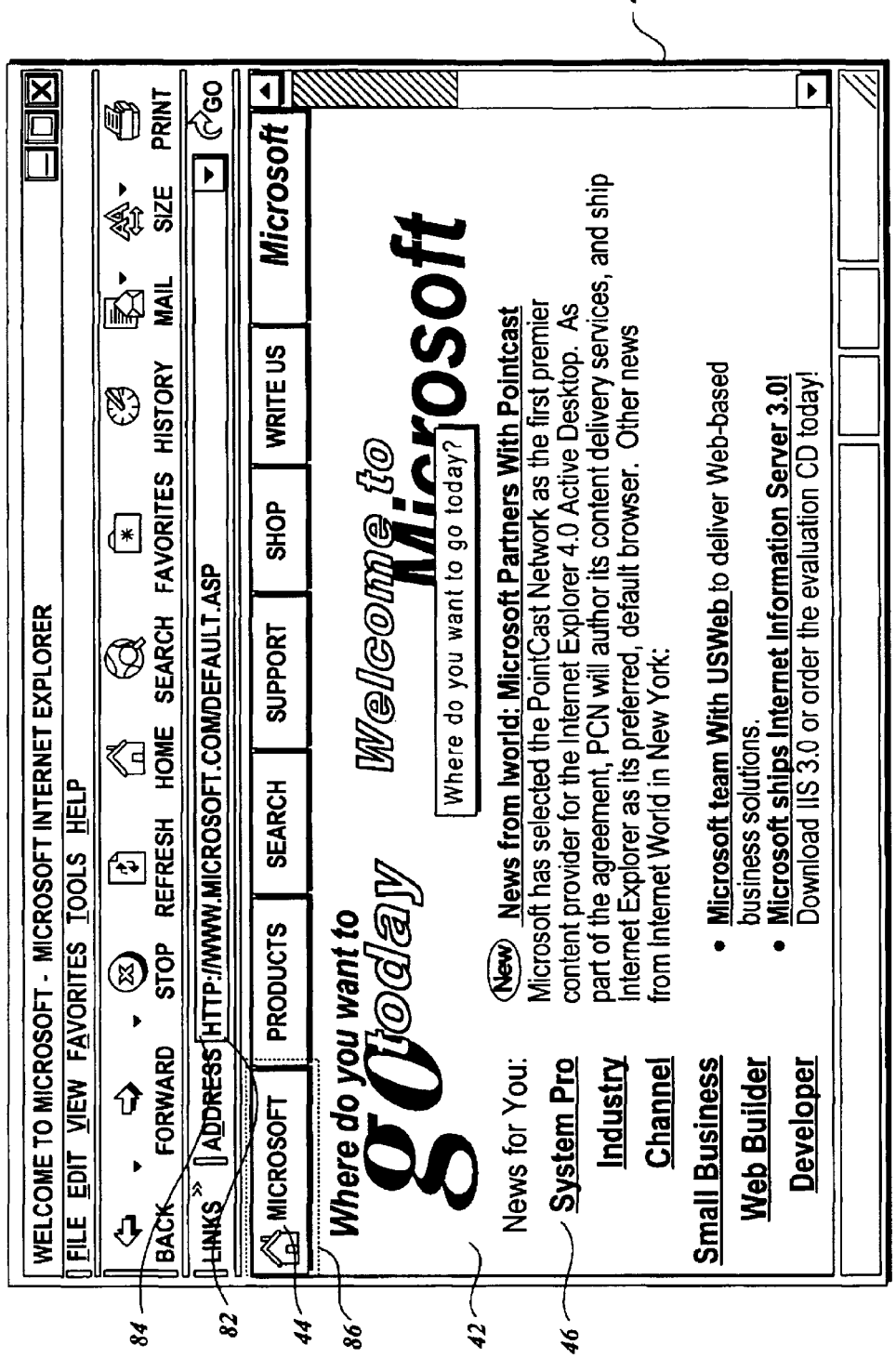
Figure 6C:
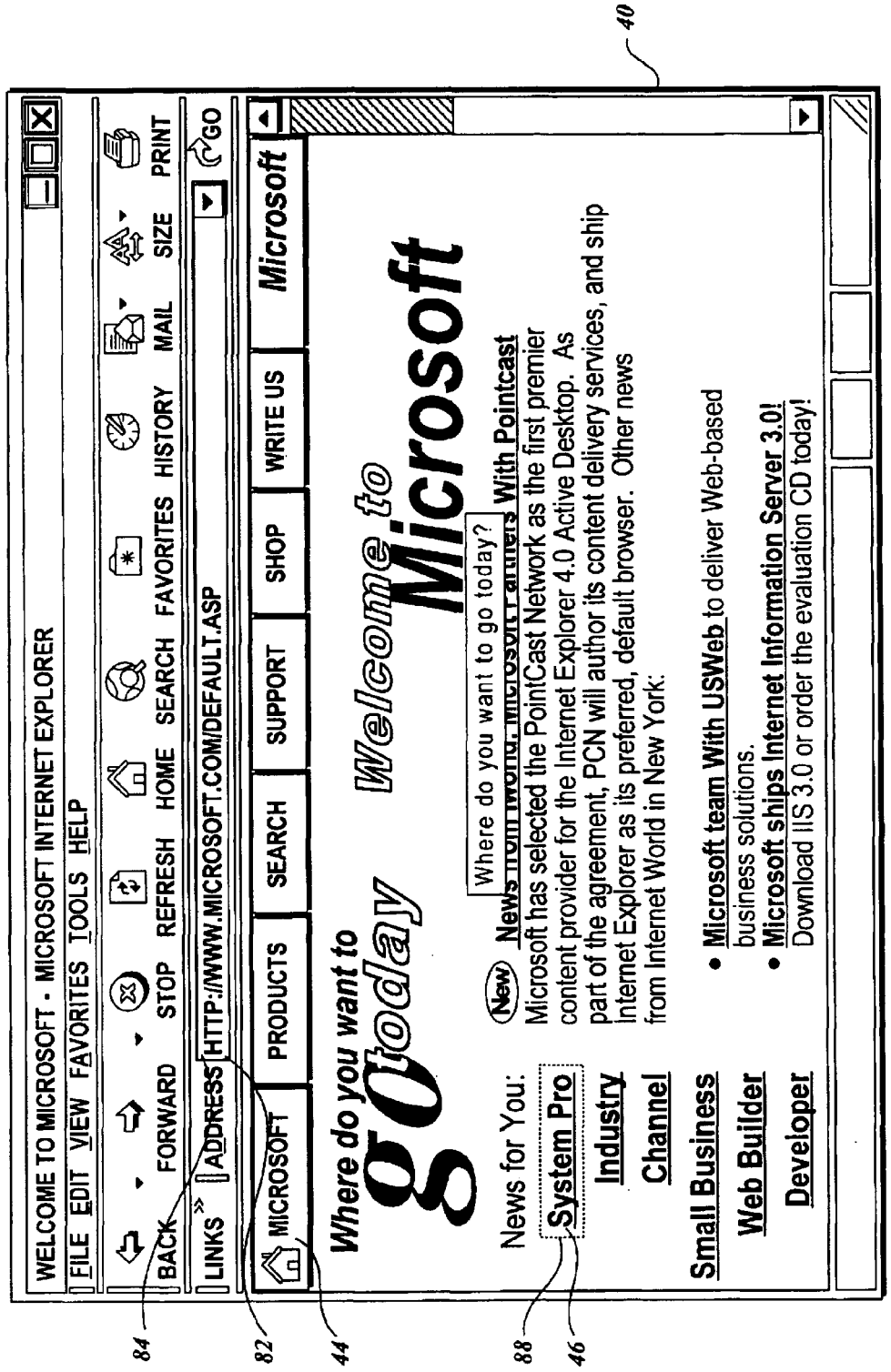

Referring now to FIG. 4, substrate 18 configured for use with housing 12 is illustrated. Substrate 18 includes a plurality of ceramic plates 34. Each ceramic plate 34 is held in a spaced relation to other ceramic plates by a plurality of spacers 38. Thus, plates 34 and spacers 38 define a plurality of rectangular flow paths 36 there between. In a first embodiment, substrate 18 is provided as a single piece assembly having plates 34 and spacers 38 adhered together. In alternate embodiments, substrate 18 is a multi-piece assembly. Applying high voltage electricity to plates 34 generates the non-thermal plasma field necessary to convert NO into nitrogen dioxide $NO_2$.

Substrate 18 is positioned within housing 12 such that flow paths 36 are aligned with and in fluid communication with inlet opening 15 and outlet opening 17 of the housing. Thus in use, exhaust gas is directed into housing 12 through inlet opening 15, into flow paths 36 where the exhaust gas is exposed to the non-thermal plasma field. The exhaust gas exists flow paths 36 of substrate 18 and is directed out of housing 12 through outlet opening 17.

Flow paths 36 produce structurally weak zones or areas 40 of plates 34 of substrate 18. Areas 40 are capable of withstanding low compressive forces, and are therefore susceptible to crush during stuffing or clamping of the substrate. Substrate 18 also includes medium strength compressive force bearing areas 42 and high strength compressive force bearing areas 44 in plates 34. Areas 42 and 44 are formed at the intersection of plates 34 and spacers 38, and are capable of withstanding higher compressive forces than areas 40. Thus, the varying strength of areas 40, 42 and 44 affect how substrate 18 is retained in housing 12.

Figure 5:
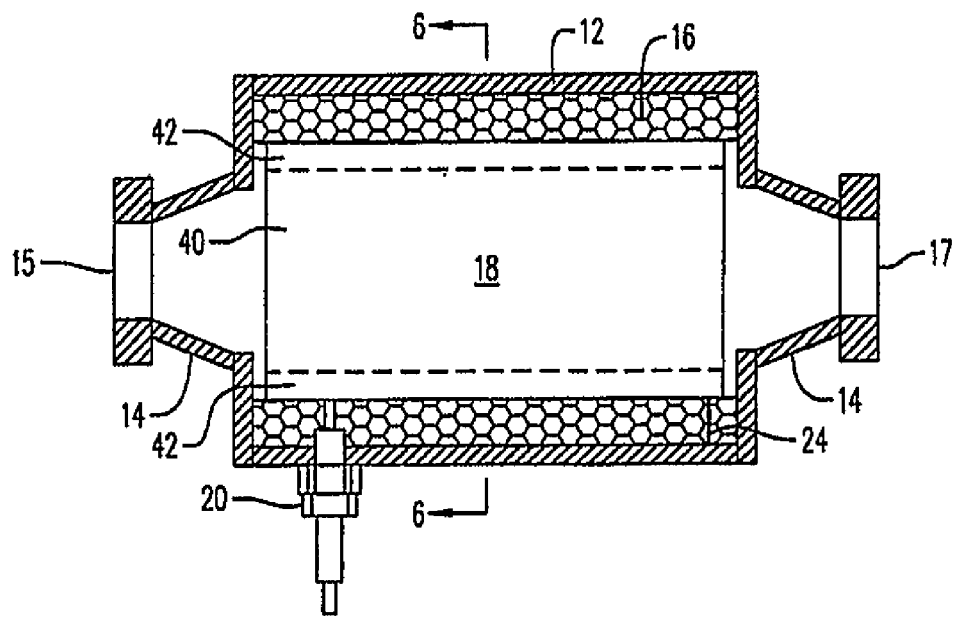
Figure 6:
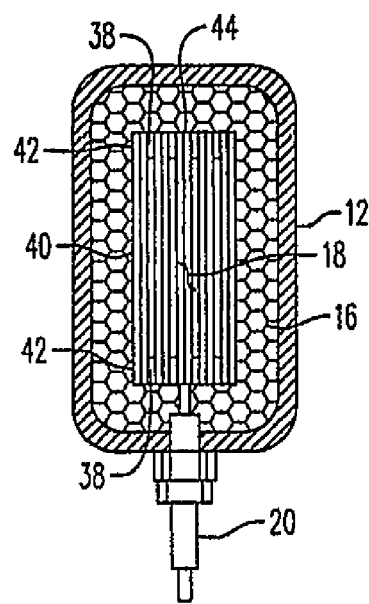
Figure 7:
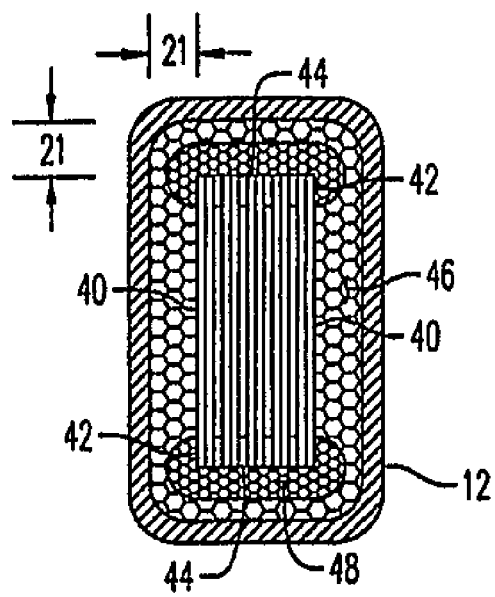
Figure 8:
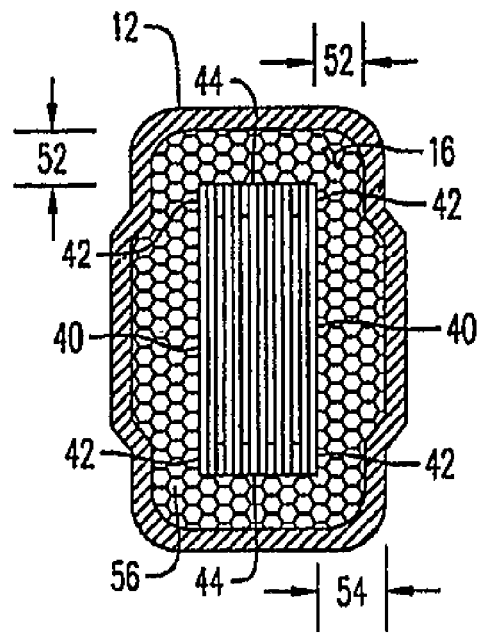

Referring now to FIGS. 5 and 6, substrate 18 is illustrated retained in housing 12 by retention material 16 with respect to the location of areas 40, 42 and 44 in the housing. Substrate 18 has a large weight relative to its medium strength areas 42 and high strength areas 44. However, prior reactors 10 wrapped retention material 16 about substrate 18 without consideration for where the retention forces supplied by the retention material act. In use, reactor 10 is subjected to forces, such as road impact forces and vibrational forces. Accordingly and in order to protect substrate 18, these forces are dampened by retention material 16 such that the substrate is held in place in housing 12 without damaging or crushing the substrate.

It has been determined that retention material 16 should provide higher retention forces to substrate 18 in its medium strength areas 42 and high strength areas 44, but lower retention forces to the substrate in its low strength areas 40. Accordingly, retention material 16 is applied in the manners described below for providing higher retention forces at medium strength areas 42 and high strength areas 44, but lower retention forces at low strength areas 40.

Figure 7:
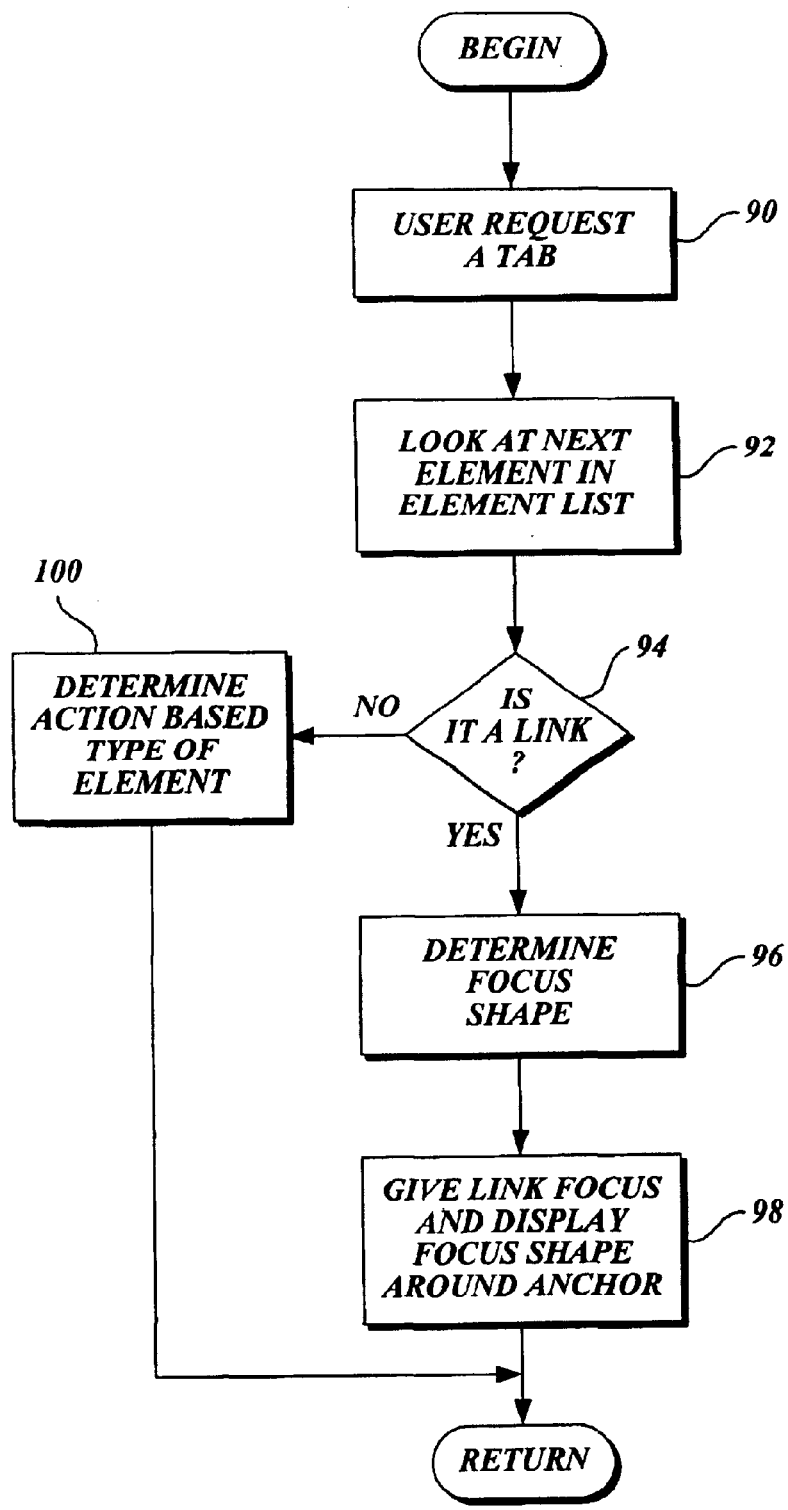
FIG. 7 is a cross sectional view of an alternative embodiment of the present invention.
Figure 8:
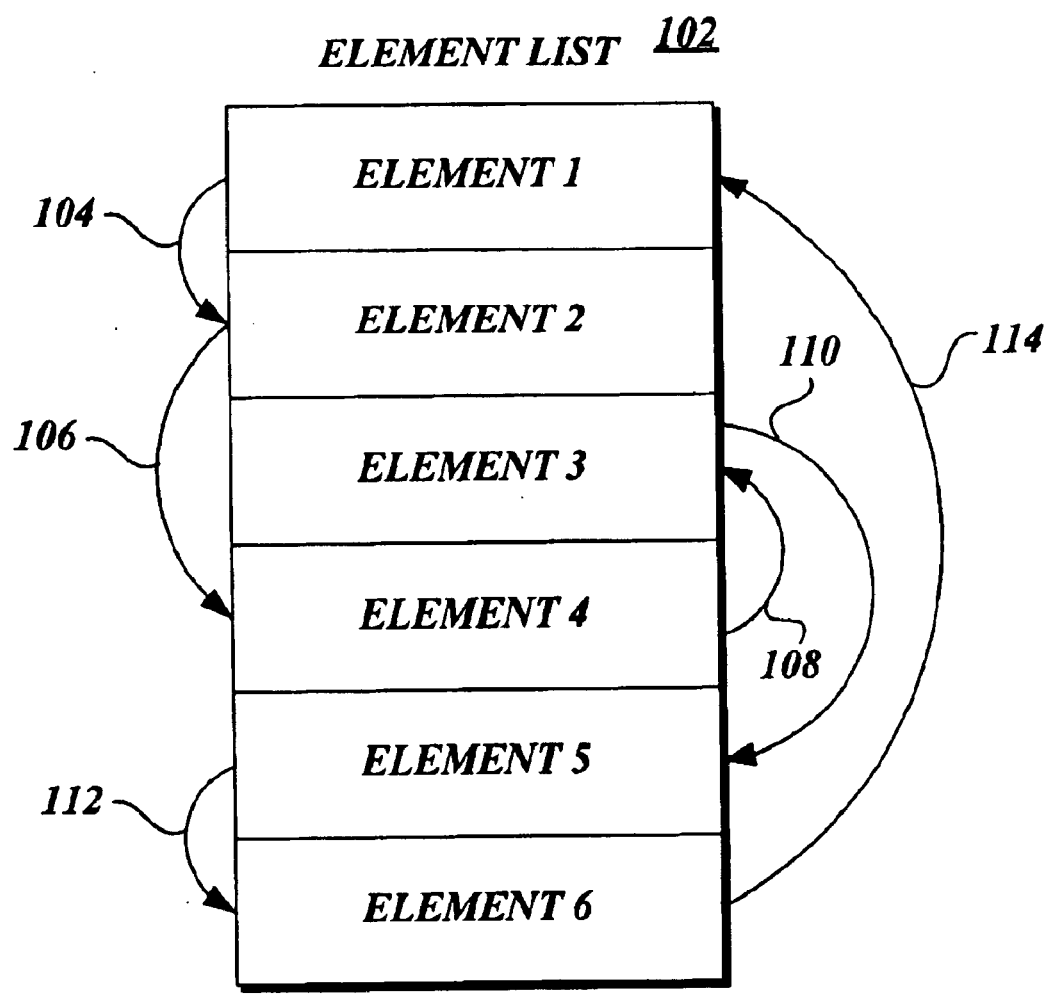
FIG. 8 is a cross sectional view of another alternative embodiment of the present invention.
Figure 9A:
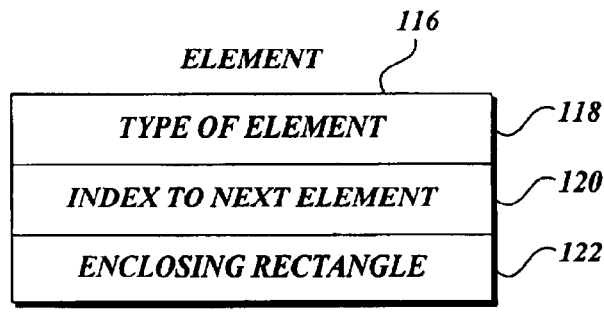
FIG. 9 is a cross sectional view of yet another alternative embodiment of the present invention.
Figure 9B:
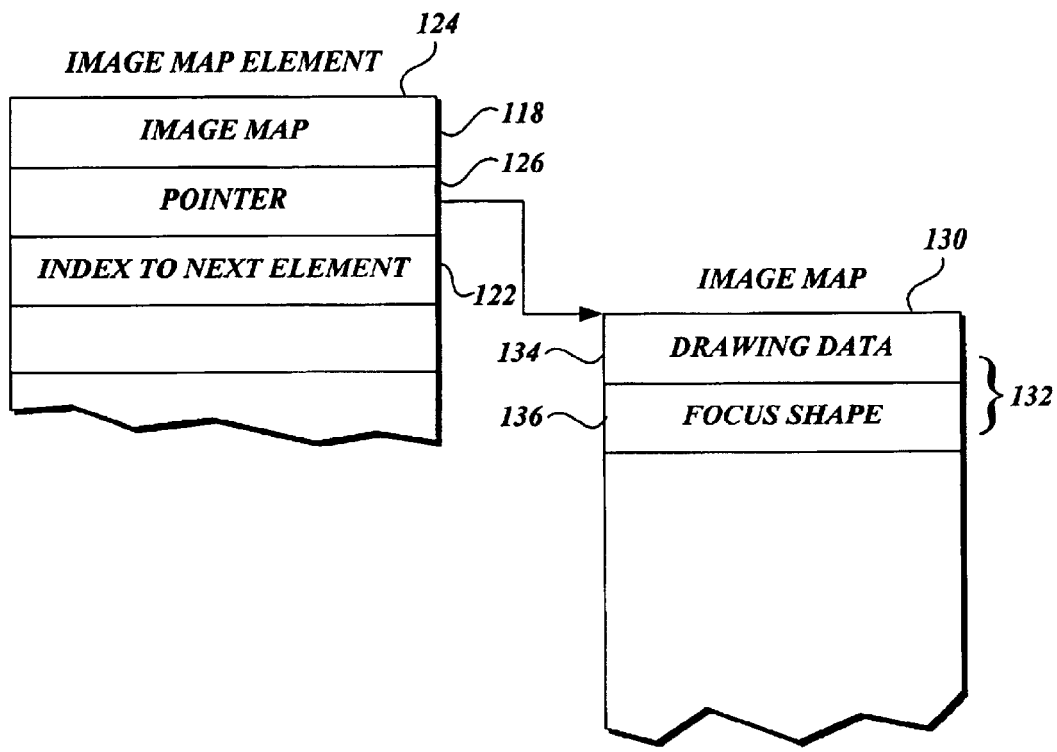
Figure 9:
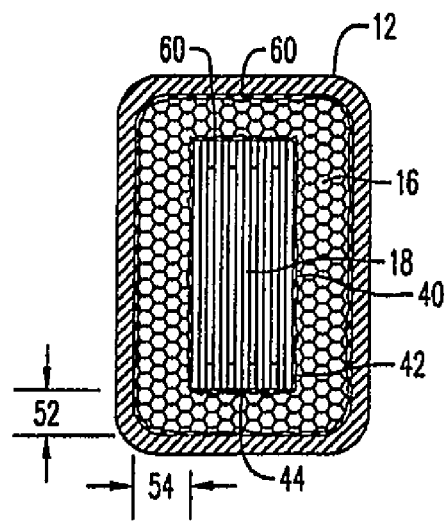
Figure 10:
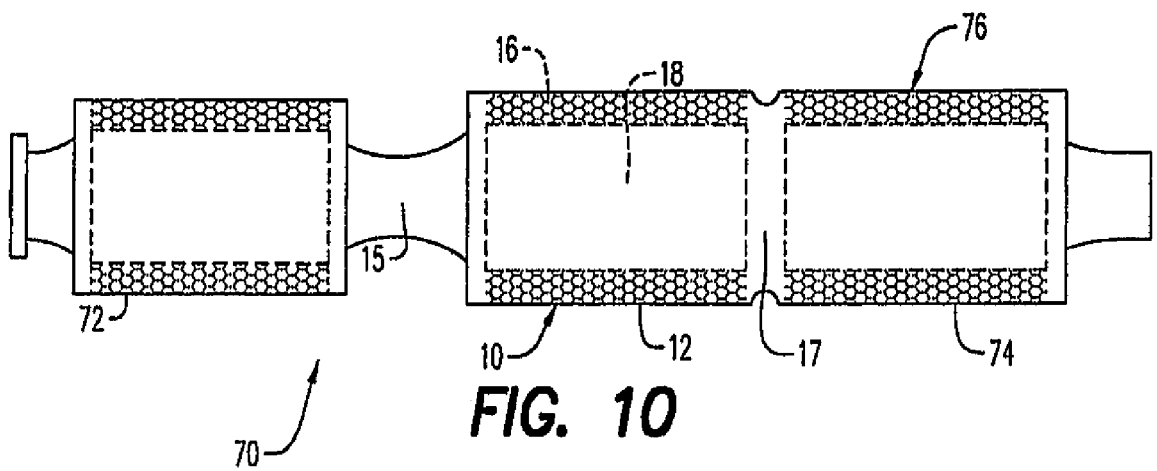
Figure 11:
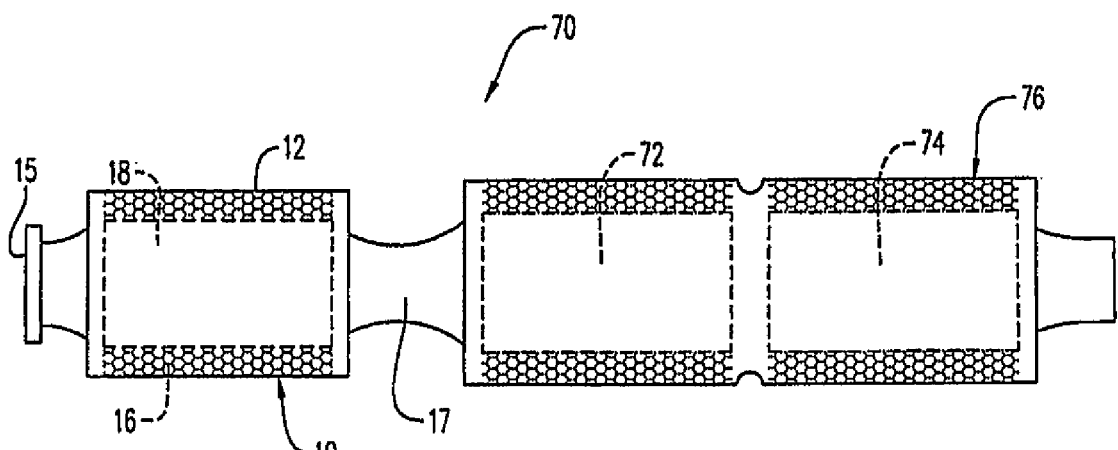

Referring now to FIGS. 7 through 9, exemplary embodiments of reactor 10 are provided. FIGS. 7 through 9, similar to FIG. 6, are cross sections of reactor 10, but for purposes of clarity refrain from illustrating certain aspects of the reactor.

For example, retention material 16 is adapted to provide unequal retention forces depending on the strength of substrate 18 by using multiple layers of the retention material having varying densities. In the embodiment of FIG. 7, reactor 10 has an equal gap 21 between housing 12 and substrate 18 around all sides of the substrate. Retention material 16 includes a first layer 46 and a second layer 48. Second layer 48 is wrapped about substrate 18 at medium strength areas 42 and high strength areas 44. First layer 46 is then wrapped about second layer 48 and low strength areas 40 of substrate 18. Accordingly, retention material 16 provides a single layer of support at low strength areas 40 and a double layer of support at medium strength areas 42 and high strength areas 44. Thus at the single layer of retention material 16, the retention material provides a lower retention force to substrate 18. However at the double layers of retention material 16, the retention material provides a higher retention force to substrate 18.

Alternatively, housing 12 is adapted to provide unequal retention forces depending on the strength of substrate 18 by using multiple gap distances between the substrate and housing 12. In the embodiment of FIG. 8, retention material 16 has a single insulation layer. Reactor 10 has an unequal gap between housing 12 and substrate 18. More specifically, housing 12 has a first or narrower gap 52 at medium strength areas 42 and high strength areas 44 of substrate 18, and has a second or wider gap 54 at low strength areas 40. A single layer 56 of retention material 16 is wrapped about substrate 18. Accordingly, the retention forces applied to low strength areas 40 by layer 56 are less than the retention forces applied to medium strength areas 42 and high strength areas 44 of the substrate due to the variance between first gap 52 and second gap 54.

Similarly, in the embodiment of FIG. 9, reactor 10 has an unequal gap between housing 12 and substrate 18. Here, housing 12 has a first or narrower gap 52 at high strength areas 44 of substrate 18, and has a second or wider gap 54 at low strength areas 40 and medium strength areas 44. A single layer 56 of retention material 16 is wrapped about substrate 18. Accordingly, the retention forces applied to low strength areas 40 and medium strength areas 42 by layer 56 are less than the retention forces applied to high strength areas 44 of the substrate due to the variance between first gap 52 and second gap 54.

It should be recognized that substrate 18 has been described above as being retained in housing 12 by way of example as either by multiple layers of the retention material having varying densities or multiple gap distances between the substrate and the housing. It is intended that the combination of such multiple densities and multiple gap distances be within the scope of the invention.

Also illustrated in FIG. 9, substrate 18 and/or housing 12 include a coating material 60. Coating material 60 is provided on the interior of housing 12 and the exterior of substrate 18. In a first embodiment, coating material 60 is a coating of high friction material on housing 12 and substrate 18 to increase the retention forces applied by retention material 16. In another embodiment, coating material 60 is a coating of electrical insulating material on housing 12 and substrate 18 to increase the electrical isolation between the substrate and the housing. In yet another embodiment, coating material 60 provides both electrical insulating properties and high friction properties to housing 12 and substrate 18.

Figure 10:
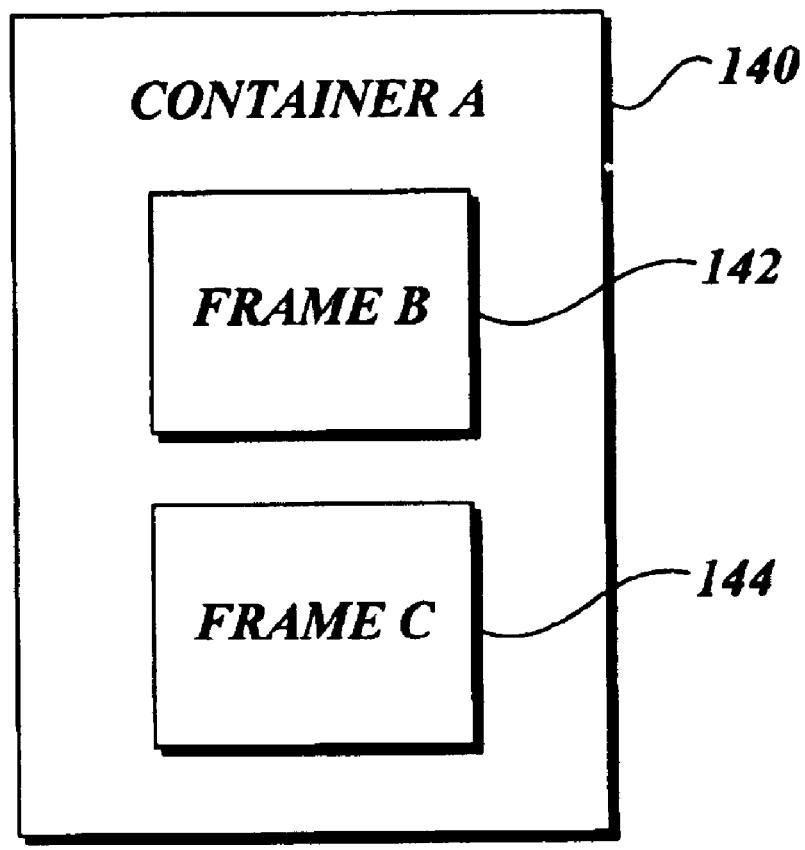
FIG. 10 is a plan view of an exemplary embodiment of an exhaust system including a non-thermal plasma reactor.

Referring now to FIG. 10, a unitary exhaust system component 70 is shown including reactor 10, a particular filter 72 and a $NO_x$ catalytic converter 74. Thus, unitary exhaust system component 70 is an integral unit having reactor 10, particular filter 72 and converter 74 in a single housing 76. Thus, particulate filter 72 being in fluid communication with inlet opening 15 of reactor 10 is adapted to remove carbon particles from exhaust prior to the exhaust entering substrate 18 of reactor 10. Next, the exhaust passes through reactor 10 and then through catalytic converter 74. Accordingly, unitary exhaust system component 70 effectively reduces the pollutants in the exhaust.

Figure 11:
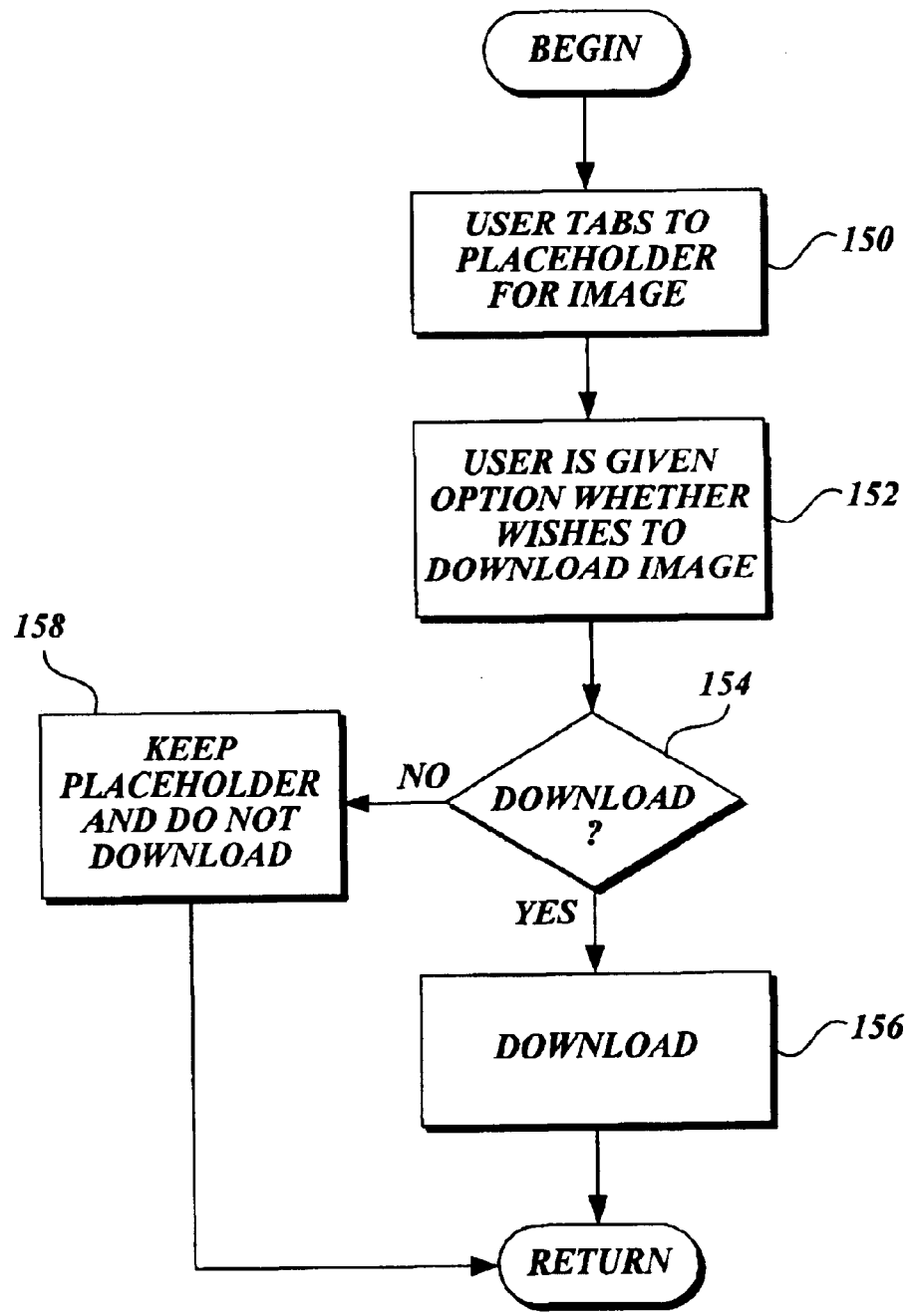
FIG. 11 is a plan view of an alternate exemplary embodiment of an exhaust system including a non-thermal plasma reactor.
Figure 1:
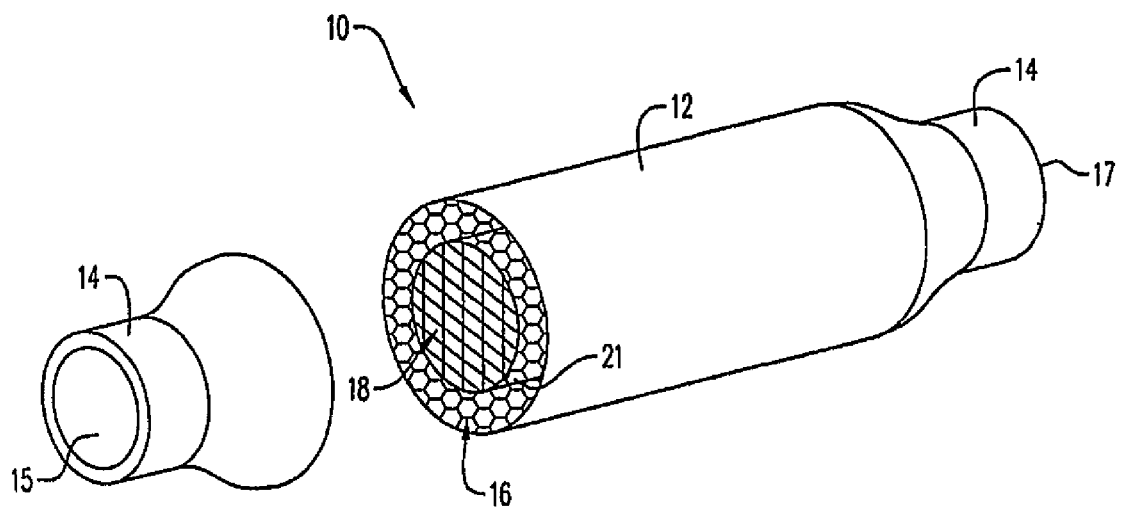

Referring now to FIG. 11, an alternate embodiment of unitary exhaust system component 70 is illustrated. It has been found that the conversion of NOx to nitrogen dioxide lowers the temperature at which diesel particulates burn. In the embodiment of FIG. 11, reactor 10 is upstream of particular filter 72 and $NO_x$ catalytic converter 74. Here, reactor 10 exhausts nitrogen dioxide into particular filter 72. Due to the lower combustion temperatures in nitrogen dioxide, particulate in particular filter 72 self ignites at temperatures that occur during normal driving. Exhaust gas flows through inlet opening 15 of reactor 10, out of outlet opening 17 into particulate filter 72. Next, the exhaust passes through catalytic converter 74. Accordingly, unitary exhaust system component 70 effectively reduces the pollutants in the exhaust.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

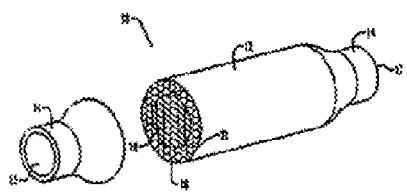

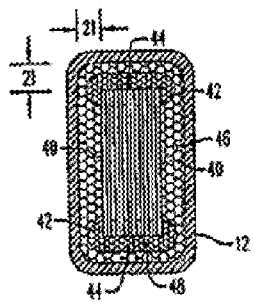

What is claimed is:

1. A non-thermal plasma reactor, comprising:
   a plasma-generating substrate having one or more flow paths for an exhaust gas, said plasma-generating substrate including first area and second area, said first area being capable of withstanding a lower compressive force than said second area;
   a housing having an inlet opening and an outlet opening;
   a voltage source being adapted to supply a voltage to said plasma-generating substrate for generating a plasma field; and
   a retention material retaining said plasma-generating substrate in said housing such that said one or more flow paths are in fluid communication with said inlet opening and said outlet opening, said retention material being configured to provide a higher retention force to said second area and a lower retention force to said first area.

2. The non-thermal plasma reactor of claim 1, further comprising a coating material on an inside of said housing and an outside of said plasma-generating substrate.

3. The non-thermal plasma reactor of claim 2, wherein said coating material is selected from the group consisting of high friction coatings, electrical insulating coatings and high friction, electrical insulating coatings.

4. The non-thermal plasma reactor of claim 1, wherein said retention material includes more than one layer having varying densities to provide said higher retention force to said first area and said lower retention force to said second area.

5. The non-thermal plasma reactor of claim 4, wherein said retention material includes a first layer of retention material and a second layer of retention material, said first layer having a higher density than said second layer, said second layer being provided at said second area of said substrate, and said first layer being provided at said first area of said substrate and over said second layer.

6. The non-thermal plasma reactor of claim 4, wherein said housing has more than one gap space between said housing and said substrate to provide said higher retention force to said second area and said lower retention force to said first area.

7. The non-thermal plasma reactor of claim 1, wherein said housing has more than one gap space between said housing and said substrate to provide said higher retention force to said second area and said lower retention force to said first area.

8. The non-thermal plasma reactor of claim 7, wherein said housing includes a first gap and a second gap, said first gap being larger than said second gap, said first gap being provided at said first area such that said retention material provides said lower retention force to said first area, and said second gap being provided at said second area such that said retention material provides said higher retention force to said second area.

9. A method of retaining a non-thermal plasma-generating substrate, comprising:
   providing a housing having a first open end and a second open end;
   providing a non-thermal plasma-generating substrate having one or more flow paths for an exhaust gas, said non-thermal plasma-generating substrate including at least one weak area and at least one strong area;
   wrapping said non-thermal plasma-generating substrate with a retention material; and
   stuffing said non-thermal plasma-generating substrate wrapped with said retention material in said housing through said first open end or said second open end to retain said plasma-generating substrate in said housing such that said one or more flow paths are in fluid communication with said first open end and said second open end, and said retention material provides a higher retention force to said at least one strong area and a lower retention force to said at least one weak area.

10. The method of claim 9, further comprising securing an first end cap to said first open end to define an inlet opening, and securing a second end cap to said second open end to define an outlet opening.

11. The method of claim 9, further comprising coating an inside of said housing and an outside of said non-thermal plasma-generating substrate with a material selected from the group consisting of high friction coatings, electrical insulating coatings and high friction, electrical insulating coatings.

12. The method of claim 9, wherein said wrapping step comprises wrapping said at least one strong area with a first layer of retention material, wrapping said at least one weak area and said first layer with a second layer of retention material, said first layer having a higher density than said second layer.

13. The method of claim 9, wherein said housing includes a first gap and a second gap, said first gap being larger than said second gap, said first gap being provided at said at least one weak area such that said retention material provides said lower retention force to said at least one weak area, and said second gap being provided at said at least one strong area such that said retention material provides said higher retention force to said at least one strong area.

14. A method of retaining a non-thermal plasma-generating substrate, comprising:
   providing a first half shell and a second half shell defining a housing;
   providing a non-thermal plasma-generating substrate having one or more flow paths for an exhaust gas, said plasma-generating substrate including at least one weak area and at least one strong area;
   wrapping said non-thermal plasma-generating substrate with a retention material; and
   securing said first half shell to said second half shell to retain said non-thermal plasma-generating substrate in said housing such that said retention material provides a higher retention force to said at least one strong area and a lower retention force to said at least one weak area.

15. The method of claim 14, further comprising coating an inside of said first half shell and said second half shell and an outside of said non-thermal plasma-generating substrate with a material selected from the group consisting of high friction coatings, electrical insulating coatings and high friction, electrical insulating coatings.

16. The method of claim 14, wherein said wrapping step comprises wrapping said at least one strong area with a first layer of retention material, wrapping said at least one weak area and said first layer with a second layer of retention material, said first layer having a higher density than said second layer.

17. The method of claim 14, wherein said housing includes a first gap and a second gap, said first gap being larger than said second gap, said first gap being provided at said at least one weak area such that said retention material provides said lower retention force to said at least one weak area, and said second gap being provided at said at least one strong area such that said retention material provides said higher retention force to said at least one strong area.

* * * * *

UNITED STATES PATENT AND TRADEMARK OFFICE
CERTIFICATE OF CORRECTION

| | | |
|---|---|---|
| PATENT NO. | : 6,893,617 B2 | Page 1 of 9 |
| APPLICATION NO. | : 09/881277 | |
| DATED | : May 17, 2005 | |
| INVENTOR(S) | : Robert X. Li et al. | |

It is certified that error appears in the above-identified patent and that said Letters Patent is hereby corrected as shown below:

Delete all of the drawing figures contained on sheets 1 of 17 through 17 of 17 and the title page, as shown inclusive, and replace them with substitute sheets 1 of 7 through 7 of 7, inclusive, containing figures 1-11 and title page.

Signed and Sealed this

Thirty-first Day of July, 2007

JON W. DUDAS
*Director of the United States Patent and Trademark Office*

United States Patent
Li et al.

(10) Patent No.: US 6,893,617 B2
(45) Date of Patent: May 17, 2005

(54) APPARATUS AND METHOD FOR RETENTION OF NON-THERMAL PLASMA REACTOR

(75) Inventors: Robert X. Li, Grand Blanc, MI (US); Michael R. Foster, Columbiaville, MI (US); David E. Nelson, Waterford, MI (US); Alan G. Turek, Mayville, MI (US)

(73) Assignee: Delphi Technologies, Inc., Troy, MI (US)

(*) Notice: Subject to any disclaimer, the term of this patent is extended or adjusted under 35 U.S.C. 154(b) by 740 days.

(21) Appl. No.: 09/881,277

(22) Filed: Jun. 14, 2001

(65) Prior Publication Data
US 2002/0192127 A1 Dec. 19, 2002

(51) Int. Cl.⁷ .................................. B01J 19/08
(52) U.S. Cl. ........................ 422/186.04; 422/186.04
(58) Field of Search .............................. 422/186.04

(56) References Cited

U.S. PATENT DOCUMENTS

| | | |
|---|---|---|
| 3,450,617 A | 6/1969 | Hellund |
| 3,541,379 A | 11/1970 | Holden |
| 3,979,193 A | 9/1976 | Sikich |
| 4,232,229 A * | 11/1980 | Tanaka et al. ......... 422/186.2 |
| 4,695,358 A | 9/1987 | Mizuno et al. ......... 204/174 |
| 4,795,617 A | 1/1989 | O'Hare ......... 422/186.15 |

(Continued)

FOREIGN PATENT DOCUMENTS

| | | |
|---|---|---|
| CN | 1027828 C | 1/1995 |
| DE | 3708508 | 3/1987 |
| EP | 0043477 A2 | 6/1981 |
| EP | 0585047 A2 | 8/1993 |
| EP | 0840838 B1 | 7/1996 |

(Continued)

OTHER PUBLICATIONS

Louis A. Rosocha; Los Alamos National Laboratory; *Non-thermal Plasma Applications to Pollution Control and Environmental Remediation*; First International Conference on Advanced Oxidation Technologies for Water and Air Remediation; London, Ontario, Canada, Jun. 25–30, 1994.

(Continued)

*Primary Examiner*—Kishor Mayekar
(74) *Attorney, Agent, or Firm*—Paul L. Marshall

(57) ABSTRACT

A non-thermal plasma reactor is provided. The reactor includes a plasma-generating substrate, a housing, a voltage supplied to the plasma-generating substrate, and a retention material. The plasma-generating substrate has one or more flow paths for an exhaust gas. The plasma-generating substrate includes at least one weak area and at least one strong area. The housing has an inlet opening and an outlet opening. The voltage is supplied to the plasma-generating substrate for generating a plasma field. The retention material retains the plasma-generating substrate in the housing such that the one or more flow paths are in fluid communication with the inlet opening and the outlet opening. The retention material is configured to provide a higher retention force to the at least one strong area and a lower retention force to the at least one weak area.

17 Claims, 17 Drawing Sheets